United States Patent [19]

Gandrud

[11] 3,902,738
[45] Sept. 2, 1975

[54] APPARATUS FOR SECURING A PAIR OF LATERALLY SPACED BICYCLES TOGETHER

[76] Inventor: Ebenhard S. Gandrud, P.O. Box 528, Owatonna, Minn. 55060

[22] Filed: Jan. 7, 1974

[21] Appl. No.: 431,419

[52] U.S. Cl................................. 280/209; 280/231
[51] Int. Cl............................................ B62k 13/06
[58] Field of Search ........... 280/209, 289, 203, 202, 280/204, 293, 287, 7.16, 231; 224/33 R, 33 A; 296/40

[56] References Cited
UNITED STATES PATENTS

| | | | |
|---|---|---|---|
| 1,013,007 | 12/1911 | Fowler et al. | 280/202 |
| 1,030,844 | 6/1912 | Howell | 280/202 |
| 2,498,663 | 2/1950 | Easley | 224/33 R |
| 2,601,994 | 7/1952 | Richman | 280/304 |
| 2,752,169 | 6/1956 | Abel | 280/304 |
| 2,777,711 | 1/1957 | Yokomaki | 280/287 |
| 3,718,345 | 2/1973 | Bringman | 280/293 |
| 3,768,834 | 10/1973 | Singleton | 280/209 |

FOREIGN PATENTS OR APPLICATIONS

| | | | |
|---|---|---|---|
| 22,529 | 1896 | United Kingdom | 280/209 |
| 15,630 | 1898 | United Kingdom | 280/209 |
| 684,979 | 8/1951 | United Kingdom | 224/33 R |

Primary Examiner—Kenneth H. Betts
Assistant Examiner—Jack D. Rubenstein
Attorney, Agent, or Firm—Merchant, Gould, Smith & Edell

[57] ABSTRACT

A plurality of elongated rigid spacers and connector devices at opposite ends of the spacers for connecting a pair of bicycles together in side-by-side relationship. A pair of radial arms have rear ends for connection to the steering forks of the bicycles and front ends extending forwardly of the front bicycle wheels. A rigid connector bar extends between and is pivotally connected at its opposite ends to the front ends of the radial arms. Latches connect the spacers to the connector devices for quick attachment of the bicycles to the spacers and for quick detachment therefrom.

2 Claims, 9 Drawing Figures

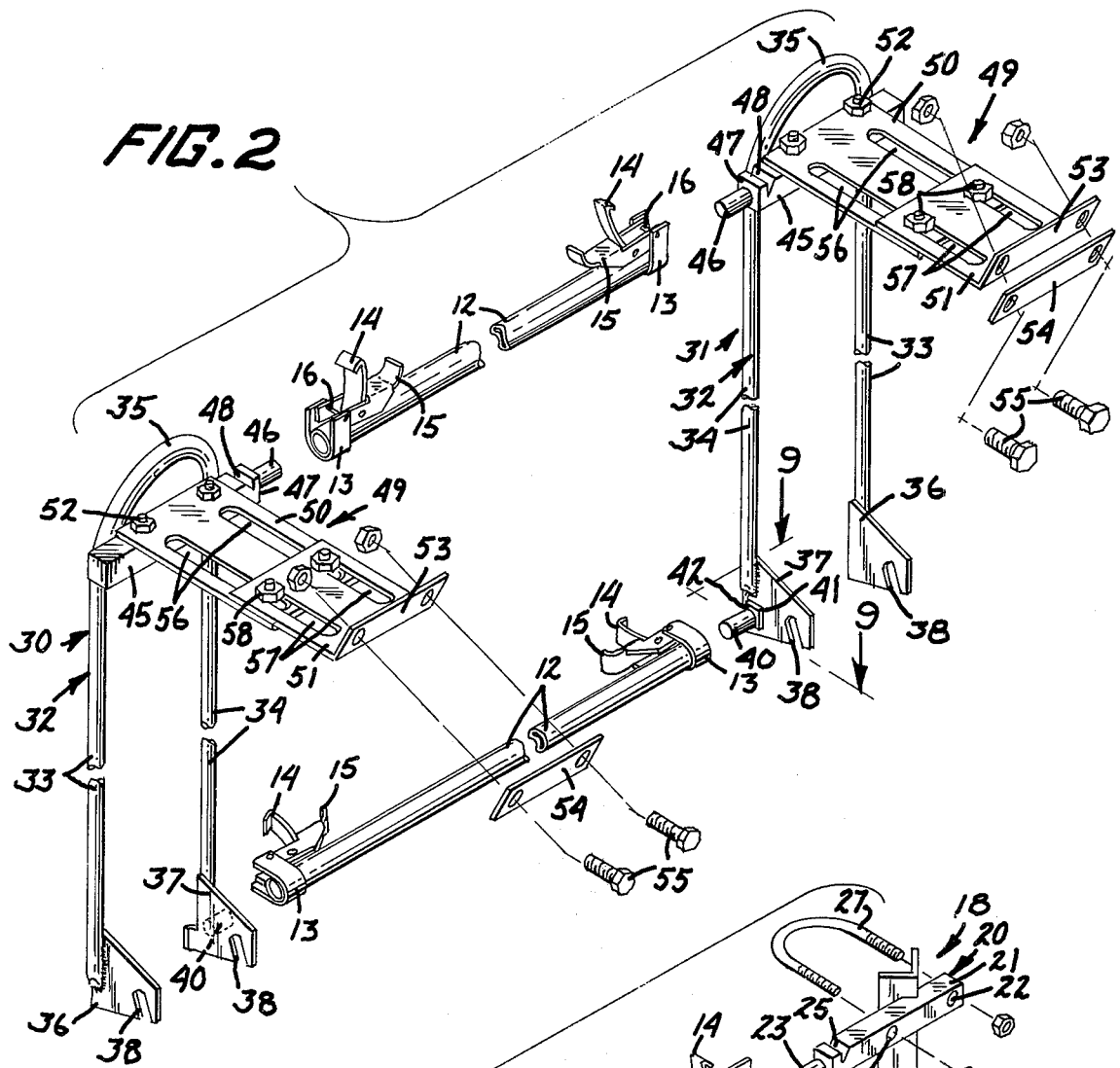
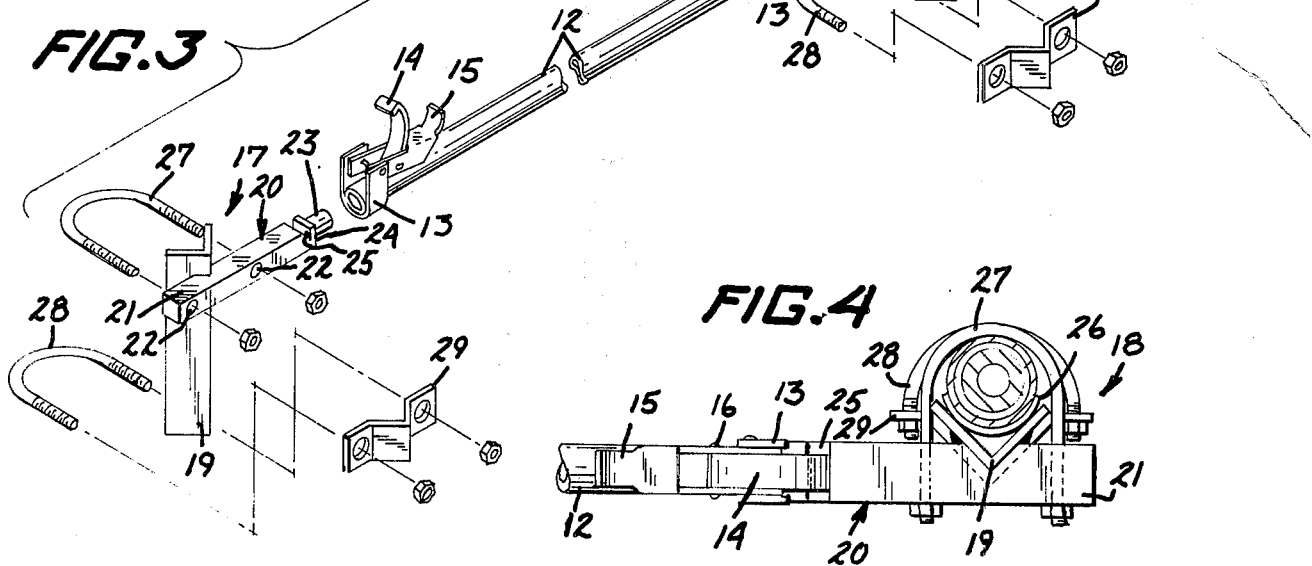

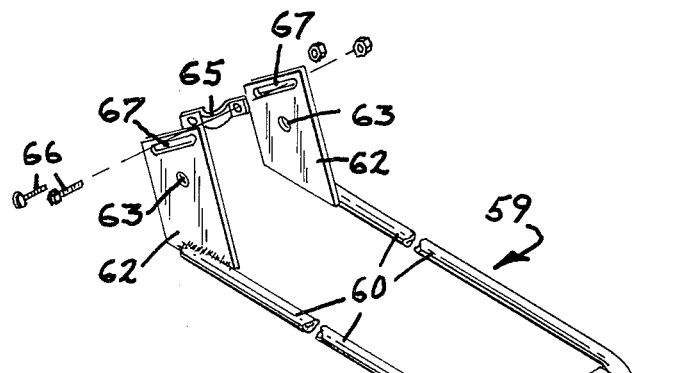
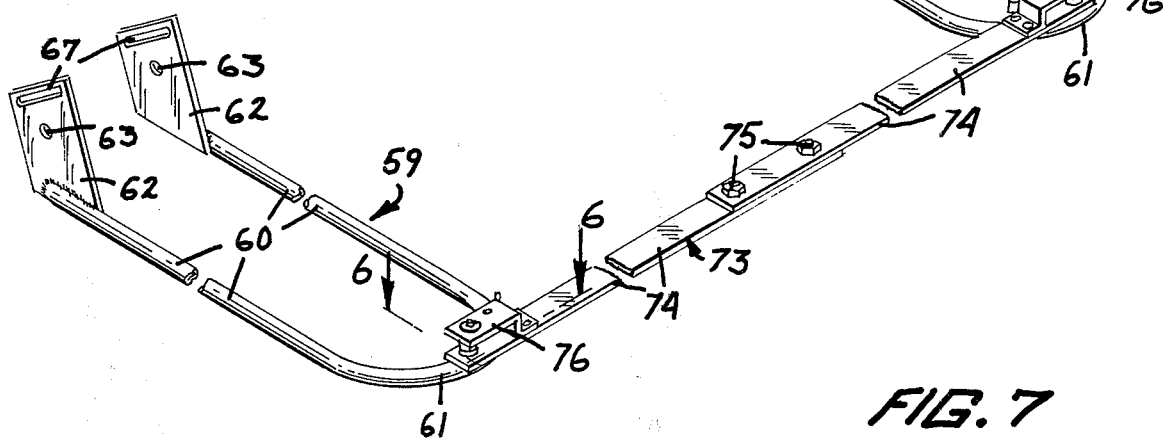
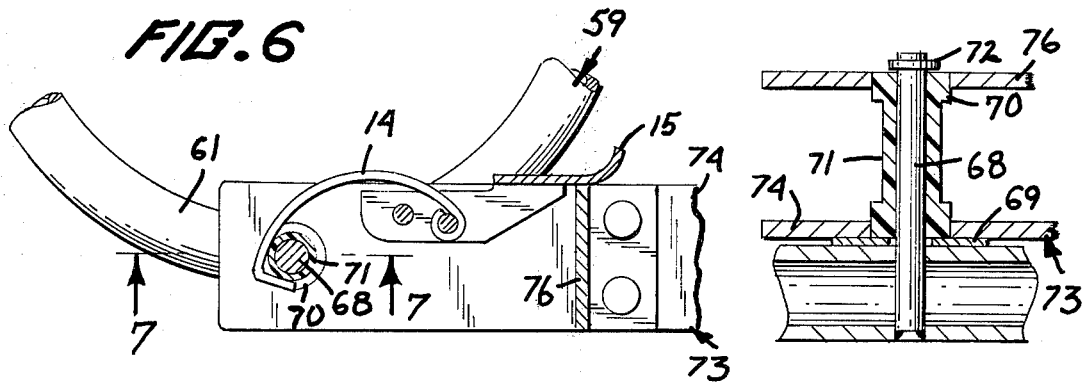
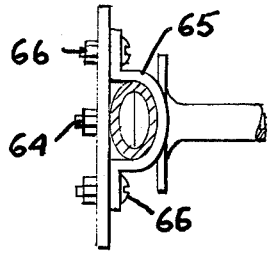
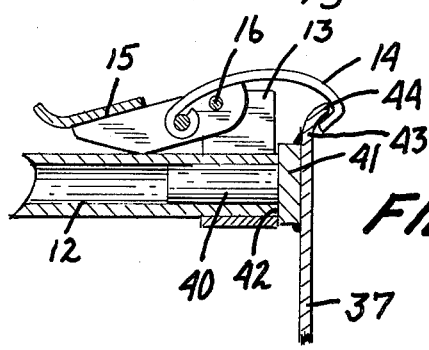

APPARATUS FOR SECURING A PAIR OF LATERALLY SPACED BICYCLES TOGETHER

BACKGROUND OF THE INVENTION

Heretofore, many devices have been produced for connecting a pair of bicycles together so that two persons may ride in side-by-side relationship. Difficulty has been experienced in achieving easy steering of bicycles thus connected, particularly when a degree of precision in the steering is to be expected. Further, in earlier connecting devices, the connection and disconnection of a pair of bicycles for side-by-side or for independent riding, is time consuming requiring the use of tools and parts which are usually lost.

SUMMARY OF THE INVENTION

An important object of this invention is the provision of apparatus for connecting a pair of bicycles in side-by-side parallel relationship, which provides easy steering of the bicycles thus connected.

Another object of this invention is the provision of apparatus as set forth which permits rapid and easy coupling of a pair of bicycles for side-by-side riding and for as rapid and easy uncoupling thereof for independent travel.

To these and other ends, I provide a plurality of elongated spacer elements in the nature of rigid tubes, and connector devices adapted to be mounted on spaced portions of the frames of a pair of bicycles and releasably locked to opposite ends of the tube to hold the bicycles in spaced apart relationship. A pair of rigid radial arms are fixedly mounted each to a lower end portion of the front steering fork of a different bicycle, each extending from the fork to a point forwardly of the front bicycle wheel. An elongated rigid connector rod has its opposite ends each pivotally connected to the front end of a different one of the radial arms ahead of the front bicycle wheels. This arrangement of long radial arms provides for easy and precise control of the steering of both bicycles.

The connector devices each include stub shafts receivable in the opposite ends of the spacer tubes and releasably locked therein by latches which permit an easy joining and separation of the bicycles for joint or separate operation as desired, without the use of tools.

DESCRIPTION OF THE DRAWINGS

FIG. 2 is an exploded fragmentary perspective of a rear connecting portion of the apparatus;

FIG. 3 is a fragmentary exploded perspective of a front portion of the apparatus of this invention;

FIG. 4 is an enlarged fragmentary view partly in top plan and partly in section, taken on the line 4—4 of FIG. 1;

FIG. 5 is an exploded perspective view of the steering connections of this invention;

FIG. 6 is an enlarged fragmentary view partly in top plan and partly in section, taken on the line 6—6 of FIG. 5;

FIG. 7 is a fragmentary section taken substantially on the line 7—7 of FIG. 6, some parts being removed;

FIG. 8 is an enlarged fragmentary detail as seen from line 8—8 of FIG. 1; and

FIG. 9 is an enlarged fragmentary section taken substantially on the line 9—9 of FIG. 2.

DETAILED DESCRIPTION OF THE PREFERRED EMBODIMENT

Figure 1:
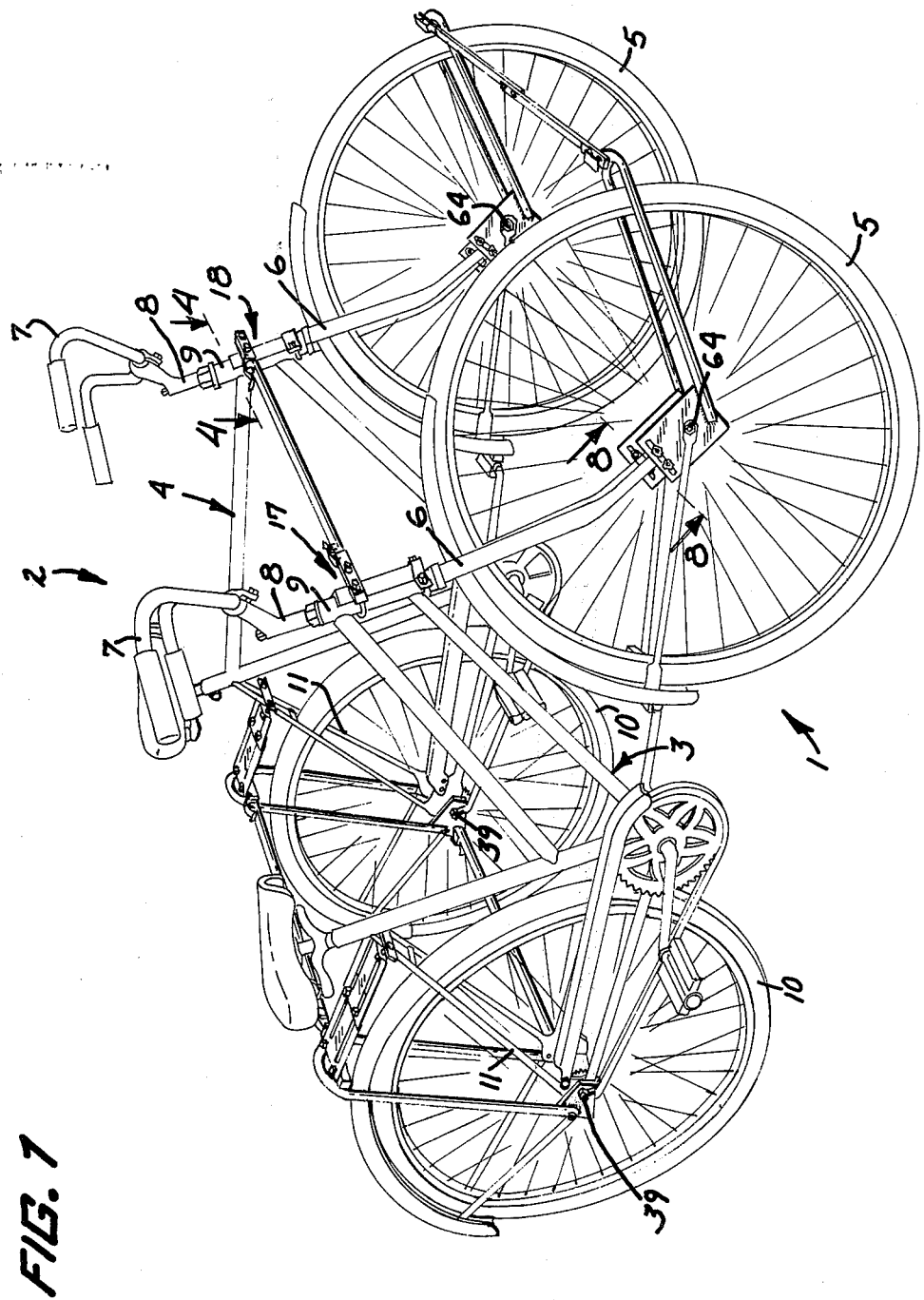
FIG. 1 is a view in perspective of a pair of bicycles and the apparatus of this invention connecting the bicycles in side by side parallel relationship.

In FIG. 1, a pair of conventional bicycles are indicated generally at 1 and 2, the bicycles 1 and 2 including frames 3 and 4 respectively, front wheels 5 mounted in steering forks 6 connected to handle bars 7 by means of stems 8 extending through head tube portions 9 of the frames 1 and 2, and rear wheels 10 journaled in the lower rear end portions of rear forks 11 of the frames 3 and 4. The bicycles 1 and 2 do not, in and of themselves, constitute the instant invention. Hence, further detailed showing and description thereof is believed unnecessary, and is omitted in the interest of brevity.

The apparatus of this invention includes a plurality of elongated tubular spacer elements 12, these being identical in length and diameter, and three in number. Each end of each spacer element 12 has welded or otherwise rigidly secured thereon a U-shaped mounting bracket 13. A plurality of metallic latch hooks 14 have one end of each thereof pivotally secured to the intermediate portion of a different one of a plurality of latch actuating levers 15, one end of each lever 15 being pivotally secured to a respective bracket 13 by means of a pivot pin 16.

The latch hooks 14 with their actuator levers 15 of one of the spacer elememts 12 cooperates with a pair of connector devices 17 and 18 to hold the front end portions of the bicycles 1 and 2 in laterally spaced relationship. The connector devices 17 and 18 are substantially identical in structure except that one thereof is right hand and the other left hand. Each of the connector devices 17 and 18 comprises a saddle member 19 made from commercial angle iron or similar material, a transverse shaft 20 welded or otherwise rigidly secured to the saddle 19 and including a cross-sectionally rectangular body portion 21 having a pair of longitudinally spaced openings 22 therethrough, and a diametrically reduced stub shaft portion 23 projecting longitudinally from one end of the body portion 21 and cooperating therewith to define a shoulder 24. Inwardly of the shoulder 24, the body portion 21 is formed to provide a laterally outwardly opening notch or recess 25, see particularly FIG. 3. As shown in FIG. 1 and partly in FIG. 4, the saddles 19 of the connector devices 17 and 18 are adapted to engage the head tubes 9 of the bicycle frames 3 and 4 respectively. Preferably, and as shown in FIG. 4, each of the saddles 19 is provided with a pad or lining 26 of soft material, such as felt or rubber, to protect the paint or other finish on the head tubes 9. The connector devices 17 and 18 are rigidly secured to the head tubes 9 by nut-equipped U-bolts 27 extending through the openings 22 in the shaft body portions 21, and other nut-equipped U-bolts 28 that extend through suitable apertures in a pair of clamping brackets 29. With respect to FIGS. 1 and 3, it will be noted that the shafts 20 are secured to the saddles 19 adjacent the upper ends of the saddles 19, the brackets 29 and their respective U-bolts 28 being disposed adjacent the lower ends of their respective saddles 19.

As shown in FIGS. 1 and 3, the connector devices 17 and 18 are mounted on their respective head tubes 9 so that the shafts 20 thereof are in axial alignment with the stub shaft portions 23 extending toward each other.

The stub shaft portions 23 are adapted to snugly slidably receive the ends of one of the tubular spacer elements 12, with the ends of the spacer elements 12 abutting the shoulders 24. The front tubular element 12 is releasably locked into engagement with the shafts 20 by reception of the hooked end of the latch hooks 14 thereof in the notches 25.

The latch hooks 14 and their respective actuator levers 15 are so constructed that in the latching position of the latch hooks 14, the pivotal connection of the latch hooks 14 to their respective actuator levers 15 are disposed in over dead center relationship between the notches 25 and the adjacent latch pivot pins 16. The latch hooks 14 are preferably made from spring steel or similar metal, so as to yield slightly when being locked in engagement with their respective notches or recesses 25 to permit the actuator levers 15 to swing to their over center locking positions, but are of sufficient rigidity to firmly hold the opposite ends of the tubes or spacer element 12 against their respective shoulders 24.

As shown in FIGS. 1 and 2, the rear portions of the bicycles 1 and 2 are adapted to be connected by upper and lower ones of the tubular spacer elements 12, these rear spacer elements 12 cooperating with the front spacer element 12 to hold the bicycle frames 3 and 4 in laterally spaced parallel relationship. Means for connecting the upper and lower spacer elements 12 to the rear portions of the frames 3 and 4 comprise a pair of rear connector devices 30 and 31 that are substantially identical in structure except that one is right-hand and the other is left-hand. Each of the devices 30 and 31 includes a yoke 32 formed to provide laterally spaced parallel outer and inner legs 33 and 34 respectively and a closed upper end 35. A pair of outer and inner metallic mounting plates 36 and 37 respectively are welded to the lower ends of the legs 33 and 34 respectively in spaced parallel relationship, the anchoring plates 36 and 37 having generally downwardly opening notches 38 for reception of the outer end portions of axles 39 of the rear bicycle wheels 10. The inner anchoring plates 37 are provided with stub shafts 40 having head portions 41 that cooperate with the shafts 40 to define shoulders 42. Further, each of the inner anchoring plates 37 if formed to provide a rearwardly and angularly outwardly projecting flange 43 that defines a notch or recess 44. When the yokes 32 are mounted on their respective bicycles so that the rear wheel axles 39 are received in the notches 38, the stub shafts 40 are in opposed axial alignment and positioned to receive opposite ends of the lower one of the tubular spacer elements 12, the extreme ends of the lower spacer element 12 abuttingly engaging the shoulders 42 of the stub shafts 40. The recesses 44 of the flanges 43 are adapted to be engaged by the latch hooks 14 of the adjacent latching devices on the lower spacer element 12 to securely hold the mounting devices 30 and 31 in desired spaced apart relationship.

As shown in FIG. 1, the yokes 32 are disposed to extend vertically, straddling their respective rear wheels 10. The anchoring plates 36 and 37 are rigidly secured to their respective ends of the rear wheel axles 39 by the usual anchoring nuts screw threaded on the opposite ends of the axles 39. The connector devices 30 and 31 further include transverse shafts 45 similar to the shafts 20 and welded or otherwise rigidly secured to the closed upper end portions 35 of their respective yokes 32. The shafts 45 are provided with stub shaft portions 46, shoulders 47 and notches or recesses 48, the stub shafts 46 being adapted to snugly receive opposite end portions of the upper rear one of the tubular spacer elements 12, the extreme ends thereof abutting the shoulders 47. As with the other spacer elements 12, the upper rear spacer element 12 is secured to the shafts 45 by latch hooks 14.

In order that the connector devices 30 and 31 be properly disposed on two different bicycles, so that the stub shaft portions 46 are in accurate axial alignment, I provide locking means in the nature of a pair of extensible and contractible brackets 49, each comprising a pair of plate-like bracket elements 50 and 51, the former of which is secured to an adjacent one of the shafts 45 by nut-equipped screws or the like 52. Each bracket element 51 includes an upturned end flange 53 that is adapted to abuttingly engage the rear side portions of the rear fork 11 that are commonly known as the seat stays, above the rear wheels 11. The flanges 53 are rigidly secured to their respective seat stays by clamping plates 54 and nut-equipped clamping screws 55 that extend through aligned openings in the flanges 53 and clamping plates 54. The bracket elements 50 and 51 are disposed in overlapping arrangement, as clearly shown in FIG. 2, and have aligned slots 56 and 57 respectively. Nut-equipped clamping screws 58 extend through aligned pairs of the slots 56 and 57 to securely clamp the bracket elements 50 and 51 in desired set positions of extending or contracting movement relative to each other. The adjustability of the brackets 49 provides for accurate alignement of the stub shaft portions 46 when one of the bicycles 1 or 2 is of a different style or manufacture than the other thereof.

For the purpose of coupling the front wheels of the bicycles 1 and 2 together for coordinated steering movement, I provide a pair of rigid arms 59 that are substantially identical in structure, the same being in the nature of U-shaped yokes each having laterally spaced parallel arm sections 60 and closed front end portions 61. At their rear ends, the arm sections 60 have welded or otherwise rigidly secured thereto parallel flat anchoring plates 62 having aligned openings 63 therethrough for reception of opposite ends of the axles 64 of the front wheels 5. Each of the arms or yokes 59 are disposed to straddle the front wheel 5 of a different one of the bicycles 1 and 2, and to extend generally radially forwardly with the closed front end portions 61 being disposed forwardly of the front portions of the front wheels 5. The anchoring plates 62 are held against outer surface portions of the forks 6 of the bicycles 1 and 2 by the usual nuts which hold the front wheel axles 64 in the lower ends of the forks 6 as is customary in bicycle construction. The anchoring plates 62 are further held against and frictionally locked to the lower end portions of the forks 6 by generally U-shaped brackets 65 and nut equipped screws 66 that extend through openings in the brackets 65 and through elongated slots 67 in the anchoring plates 62, the slots 67 extending in directions generally transversely of the longitudinal dimensions of the forks 6.

Each of the closed end portions 61 of the arms or yokes 59 has mounted thereon a transverse pin or shaft 68 on which is mounted a washer 69 and a spool 70, the spool 70 defining a circumferential channel 71. With reference to FIG. 7, it will be seen that the washer 69 is interposed between the spool 70 and the yoke portion 61. The shaft or pin 68 is rigidly secured in the portion 61 and the spool 70 is held against axial removal from the shaft 68 by a conventional snap ring or the like 72.

A rigid connector rod or bar 73 is shown as comprising a pair of connector rod sections 74 having their inner ends overlapping and connected by nut-equipped screws or the like 75. At their outer ends, the connector rod sections 74 have riveted or otherwise rigidly secured thereto offset brackets 76, each bracket 76 and the outer end portion of its respective connector rod section 74 having aligned openings for snug reception on a respective one of the spools 70 axially outwardly of the circumferential grooves or channels 71 thereof, see particularly FIGS. 5 and 7. Each of the connector rod sections 74 are provided with a latch hook 14 having a corresponding actuator lever 15 that is pivotally mounted between a respective one of the arms 74 and its respective bracket 76 by a pin 77. As shown in FIG. 6, the latch hooks of the connector rod 73 are adapted to have their outer hooked ends received in the circumferential grooves 71 of the spools 70, the width of each hook 14 being substantially equal to the axial length of each groove 71. When the latch hooks 14 of the connector rod 73 are in latching engagement with their respective spools 70, the connector rod 73 is locked against axial movement out of engagement with the spools 70. The slots 67 in the anchoring plates 62 permit adjustment of the yokes 59 about the axes of the front bicycles wheels 5 so that the axes of the spools 70 and their shafts 68 are parallel with the steering axes of their respective steering forks 6. It will be appreciated that the connector rod 73 can be made in a single piece. However, the overall length of the connector rod 73 is substantially greater than that of the several tubular spacer elements 12. Hence, it is preferred that the connector rod 73 be made in two parts to conserve space in packaging for shipment and storage.

I have found by considerable experimentation that, by having the yokes 59 anchored to opposite sides of each wheel and extending radially outwardly from the forks 6 to points forwardly of the front portions of the wheels 5, and connecting the yokes 59 at their outer closed end portions 61 forwardly of the wheels 5, I have been able to effect a much greater control over the steering of the bicycles than has been heretofore achieved. In fact, any steering movement imparted to one of the handle bars 7 is transferred precisely to the handle bar 7 of the other bicycle, and wobbling of the front wheels 5 has been eliminated. Further, the use of the latch hooks 14 at the opposite ends of the spacer elements 12 and connector rod 73 permits the bicycles 1 and 2 to be quickly and easily separated for individual driving, and as easily and quickly re-connected for side-by-side riding of the bicycles 1 and 2. When the bicycles are separated for independent riding, the connector devices 17 and 18 remain on the head tubes 9, the connector devices 30 and 31 remain on the rear end portions of the bicycles 1 and 2 and the yokes 59 remain secured to the lower ends of their respective forks 6. These connector devices are relatively light in weight and do not adversely affect riding of the bicycles when disconnected for independent operation.

This apparatus has been thoroughly tested and found to be completely satisfactory for the accomplishment of the objectives set forth; and, while I have shown and described a commercial embodiment of the apparatus, it will be understood that the same is capable of modification without departure from the spirit and scope of the invention, as defined in the claims.

What is claimed is:

1. Apparatus for connecting two bicycles together in side by side parallel relationship, comprising:
  a. a plurality of elongated spacer elements;
  b. connector means adapted to be mounted on the frames of a pair of bicycles at the front and rear portions of said frames;
  c. releasable means for releasably locking the ends of said spacer elements to respective ones of said connector means;
  d. and means for coupling the steering mechanisms of said bicycles together for common steering movements, comprising;
    1. a pair of front yokes each having a closed front end and a pair of laterally spaced arm sections extending rearwardly from said closed front end;
    2. a plurality of flat anchoring plate elements each rigidly secured to the rear end of a different one of said arm sections for engagement with one of the steering forks of said bicycles to dispose the arm sections of each front yoke at opposite sides of the front steering wheel of a different one of said bicycles;
    3. the anchoring plate elements of each front yoke having aligned openings for reception of opposite end portions of a bicycle front wheel axle;
    4. a plurality of fork engaging clamping members;
    5. clamping screws for each of said clamping membes;
    6. a rigid connector rod extending between the closed front ends of said front yokes;
    7. and means pivotally connecting the opposite ends of said connecting rod to said front yokes on parallel axes;
    8. each of said anchoring plate elements having a clamping screw receiving slot disposed to permit shifting of their respective yokes angularly about a bicycle front wheel axis and clamping of the front yokes in desired set positions of angular shifting movement thereof, to dispose said parallel axes in parallel relationship to the steering axes of said steering forks, said spacer elements comprising rigid tubes, said connector means including:
  e. a pair of connector members each adapted to be rigidly secured to the front frame portion of a different one of the bicycles, said connector members including opposed axially aligned stubshafts each receivable in a different end of one of said tubes;
  f. a pair of rigid rear yokes each having a pair of spaced legs connected together at their upper ends and having spaced parallel rigid rear anchoring plates at their lower ends, said rear anchoring plates having aligned rear axle receiving openings therethrough whereby said rear yokes may be mounted for forward and rearward swinging movements about their respective rear axle;
  g. a pair of opposed lower stubshafts each rigidly connected to, and projecting transversely from, one of the rear anchoring plates of a different rear yoke in radially spaced relation to said rear axle receiving openings, and each axially receivable in a different end of another one of said tubes;

h. a pair of opposed upper stubshafts each anchored to a different one of said rear yokes adjacent the upper connected ends of the legs thereof and extending axially toward each other when mounted on said bicycles, said upper stubshafts each being axially receivable in a different end of another one of said tubes;

i. locking means for releasably locking said rear yokes in different positions of said swinging movements thereof whereby to axially align the stubshafts of one thereof with those of the other thereof;

j. and quick operating means including resilient hooks for releasably locking the opposite ends of said connecting rod to said front yokes and the opposite ends of said rigid tubes to their respective stubshafts;

and said locking means comprises a pair of generally horizontally disposed extensible and retractable plate-like brackets each having a rear end rigidly secured to a different one of said upper rear stubshafts and a front end adapted to be secured to the rear fork of a respective bicycle.

2. Apparatus for connecting two bicycles together in side by side parallel relationship, comprising:

a. a plurality of elongated spacer elements;

b. connector means adapted to be mounted on the frames of a pair of bicycles at the front and rear portions of said frames;

c. releasable means for releasably locking the ends of said spacer elements to respective ones of said connector means;

d. and means for coupling the steering mechanisms of said bicycles together for common steering movements, comprising;

1. a pair of front yokes each having a closed front end and a pair of laterally spaced arm sections extending rearwardly from said closed front end;

2. a plurality of flat anchoring plate elements each rigidly secured to the rear end of a different one of said arm sections for engagement with one of the steering forks of said bicycles to dispose the arm sections of each front yoke at opposite sides of the front steering wheel of a different one of said bicycles;

3. the anchoring plate elements of each front yoke having aligned openings for reception of opposite end portions of a bicycle front wheel axle;

4. a plurality of fork engaging clamping members;

5. clamping screws for each of said clamping members;

6. a rigid connector rod extending between the closed front ends of said front yokes;

7. and means pivotally connecting the opposite ends of said connecting rod to said front yokes on parallel axes;

8. each of said anchoring plate elements having a clamping screw receiving slot disposed to permit shifting of their respective yokes angularly about a bicycle front wheel axis and clamping of the front yokes in desired set positions of angular shifting movement thereof, to dispose said parallel axes in parallel relationship to the steering axes of said steering forks; said spacer elements comprising rigid tubes, said connector means including:

e. a pair of connector members each adapted to be rigidly secured to the front frame portion of a different one of the bicycles, said connector members including opposed axially aligned stubshafts each receivable in a different end of one of said tubes;

f. a pair of rigid rear yokes each having a pair of spaced legs connected together at their upper ends and having spaced parallel rigid rear anchoring plates at their lower ends, said rear anchoring plates having aligned rear axle receiving openings therethrough whereby said rear yokes may be mounted for forward and rearward swinging movements about their respective rear axle;

g. a pair of opposed lower stubshafts each rigidly connected to, and projecting transversely, from, one of the rear anchoring plates of a different rear yoke in radially spaced relation to said rear axle receiving openings, and each axially receivable in a different end of another one of said tubes;

h. a pair of opposed upper stubshafts each anchored to a different one of said rear yokes adjacent the upper connected ends of the legs thereof and extending axially toward each other when mounted on said bicycles, said upper stubshafts each being axially receivable in a different end of another one of said tubes; said means pivotally securing the ends of said connecting rod to said front yokes comprises a pair of pivot shafts each extending upwardly from a different one of said front yokes, said connecting rod having bifurcated opposite ends each journaled on axially spaced portions of a different one of said pivot shafts, said pivot shafts each having a circumferential channel intermediate said axially spaced portions for reception of a respective one of said resilient hooks.

* * * * *